United States Patent [19]
Grant

[11] Patent Number: 5,533,548
[45] Date of Patent: Jul. 9, 1996

[54] VALVING INTERFACE FOR A POPPET VALVE

[75] Inventor: Shannon G. Grant, Peoria, Ill.

[73] Assignee: Caterpillar Inc., Peoria, Ill.

[21] Appl. No.: 443,619

[22] Filed: May 18, 1995

[51] Int. Cl.⁶ .............................. F16K 15/02; F16K 25/00
[52] U.S. Cl. ............................................. 137/540; 251/333
[58] Field of Search ............................ 137/540; 251/333

[56] References Cited

U.S. PATENT DOCUMENTS

| | | | |
|---|---|---|---|
| 3,029,835 | 4/1962 | Biello | 137/540 X |
| 3,987,814 | 10/1976 | Hall | 137/469 |
| 4,269,227 | 5/1981 | Araki | 251/333 X |
| 4,365,647 | 12/1982 | Taylor et al. | 137/489 |
| 5,193,579 | 3/1993 | Bauer | 137/540 |

FOREIGN PATENT DOCUMENTS

| | | | |
|---|---|---|---|
| 149593 | 4/1955 | Sweden | 137/540 |

OTHER PUBLICATIONS

"The Control of Cavitation in Valves", R. A. Heron, Fluid Power Symposium, Bath, England, Sep. 16–18, 1986.
SAE Paper No. 911804, "Silent Hydraulic Valves", Gabriel Silva, Milwaukee, Wisconsin, Sep. 9–12, 1991.

*Primary Examiner*—John Rivell
*Attorney, Agent, or Firm*—J. W. Burrows

[57] ABSTRACT

A valving interface is provided for use in a poppet valve. The valving interface includes a first convex contoured surface disposed on one end of a poppet and a second convex contoured surface disposed on a valve seat of a housing. When the poppet is seated on the valve seat, the first convex contoured surface contacts the valve seat on or generally adjacent the second convex contoured surface. When the poppet is spaced from the valve seat to permit fluid flow therethrough, the subject arrangement maintains a flow therethrough that keeps the static pressure above the vapor pressure thus eliminating or substantially reducing noise generated by fluid flow therethrough.

13 Claims, 3 Drawing Sheets

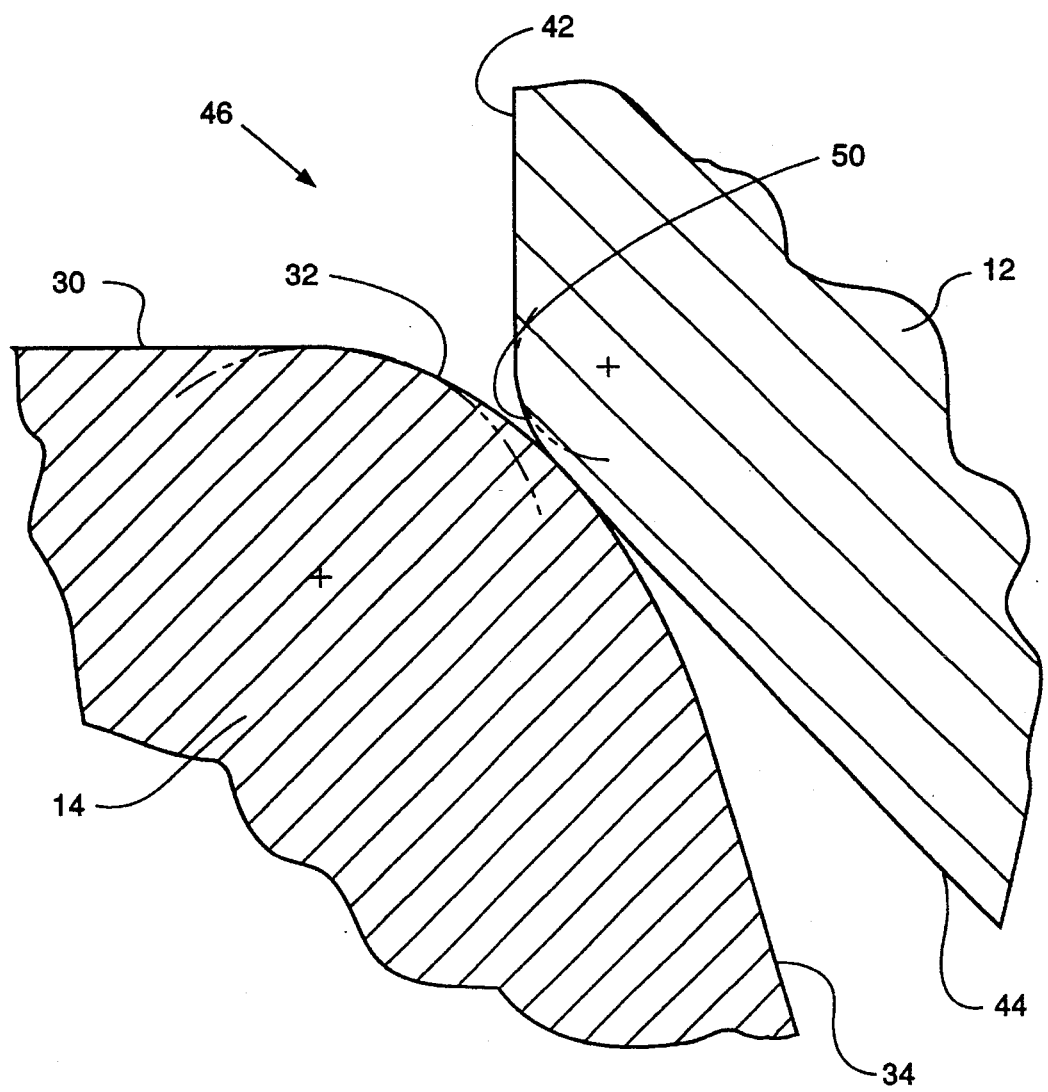
Fig_2_

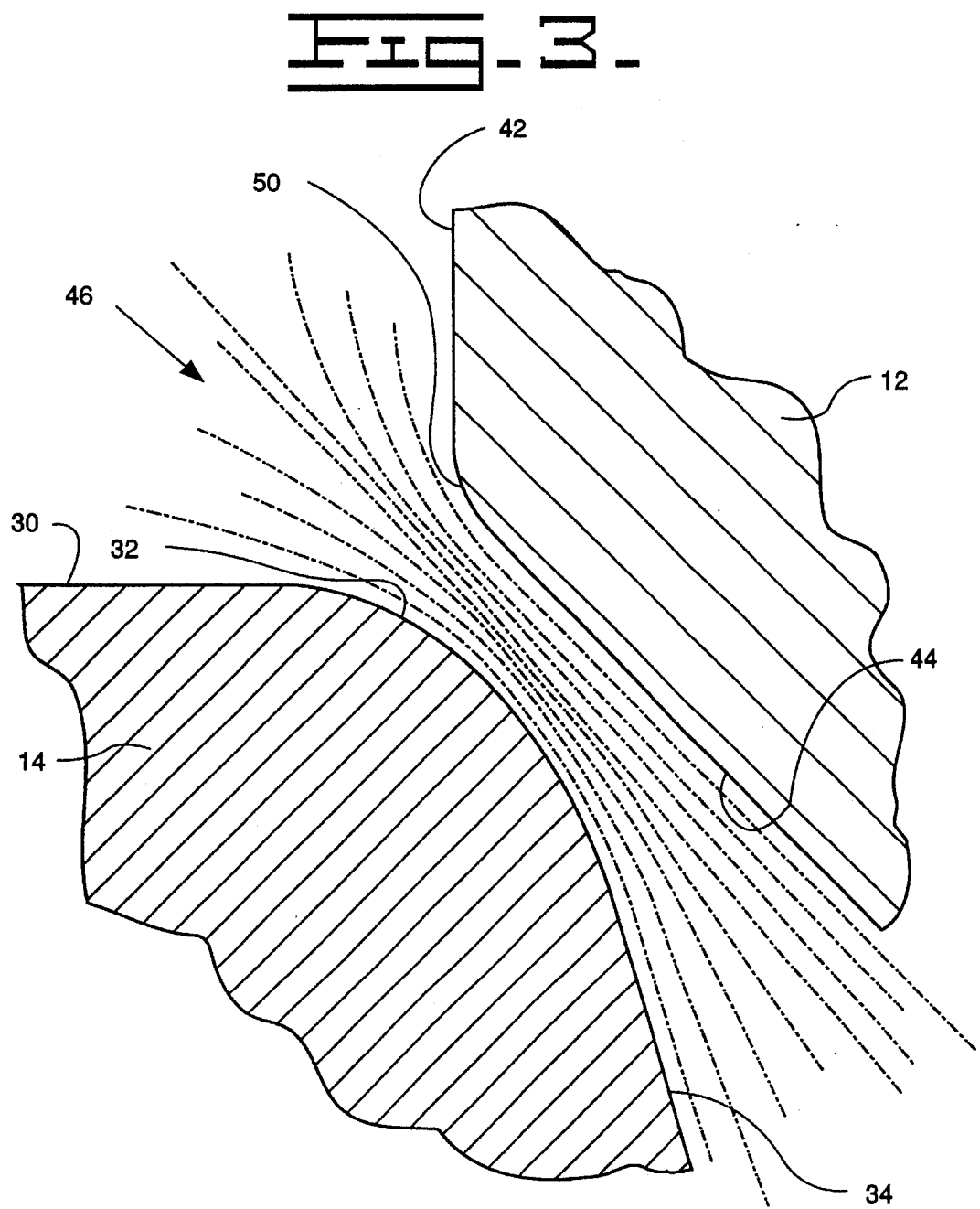

VALVING INTERFACE FOR A POPPET VALVE

DESCRIPTION

1. Technical Field

This invention relates generally to a poppet type hydraulic valve and more particularly to the interface between the poppet and the valve seat in a poppet valve.

2. Background Art

In known poppet valve assemblies, fluid flow noise is generated because the flow across the valving interface causes the static pressure to drop thus causing the formation of entrained bubbles. The noise is caused by the entrained bubbles quickly collapsing as the velocity of the fluid across the valving interface rapidly increases and decreases. As is well known, the valving interface creates an orifice and the velocity of the flow across the orifice rapidly increases as the orifice size decreases. Likewise, the increase in fluid velocity is attributed to the static pressure drop thereacross. It is also known that the hotter the fluid, the more likely that bubbles may form as the fluid flows across the orifice or valving interface. The drop in static pressure also frequently occurs in the area of sharp corners or edges. It is desirable to control the dynamic pressure and to avoid the fluid separating from the walls in order to maintain the static pressure above the vapor pressure at the valving face.

The present invention is directed to overcoming one or more of the problems set forth above.

DISCLOSURE OF THE INVENTION

In the present invention, a valving interface for a poppet valve is provided and includes a housing having a first bore, a smaller second bore at one end thereof with an angled surface extending outwardly from the smaller second bore towards the first bore to define a valve seat and a poppet slidably disposed in the first bore of the housing and having an end portion with an end surface, an angled surface generally adjacent the end surface, and a convex contoured surface disposed between the end surface and the angled surface.

The present invention provides a valving interface in a poppet valve that maintains an interface pressure above the vapor pressure of the fluid flow therethrough in order to substantially eliminate noise in the poppet valve due to flow thereacross.

BRIEF DESCRIPTION OF THE DRAWINGS

FIG. 2 is an enlarged view of a portion of the poppet valve of FIG. 1 illustrating a valving interface of the present invention; and FIG. 3 is an enlarged view of the portion of FIG. 2 with the elements of the valving interface spaced apart.

BEST MODE FOR CARRYING OUT THE INVENTION

Figure 1:
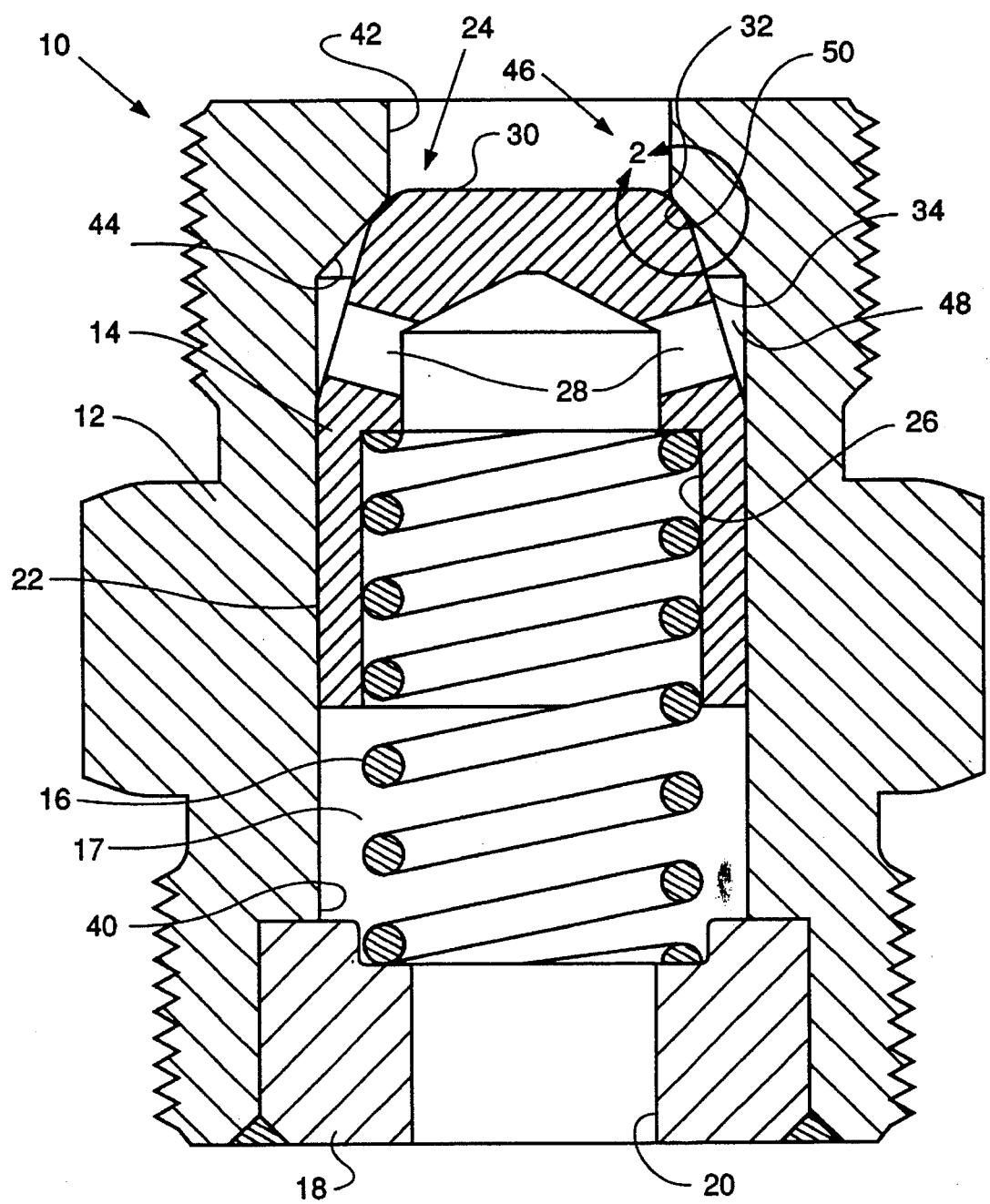
FIG. 1 is a diagrammatic representation of a poppet valve incorporating an embodiment of the present invention.

Referring to the FIG. 1 of the drawings, a poppet valve 10 is illustrated and includes a housing 12, a poppet 14, a spring 16, a spring chamber 17 and a spring retainer member 18 having an opening 20 defined therein. The poppet 14 has an outermost diameter 22, an end portion 24, a counterbore 26, and a plurality of openings 28. The end portion 24 has an end surface 30, a convex contoured surface 32 adjacent the end surface 30, and an angled surface 34 extending from the convex contoured surface 32 towards the outermost diameter 22 thereof. However, it is recognized that the angled surface 34 could terminate short of the outermost diameter 22 by a step or another angled surface having a different angle. The plurality of openings 28 are defined in the poppet 14 between the region of the angled surface 34 and the counterbore 26. In the subject embodiment, the convex contoured surface 32 is a convex spiral surface in which the radius thereof is increasing in length. It is recognized that a constant radius could be used without departing from the essence of the invention.

The housing 12 has a first bore 40 and a smaller second bore 42 defined therein with an angled surface 44 extending from the smaller second bore 42 towards the first bore 40. In the subject arrangement, the angled surface 44 connects with the first bore 40. However, it is recognized that the angled surface 44 could terminate short of the first bore 44 by a flat surface or another angled surface having a different angle. The second bore 42 and the angled surface 44 cooperate to form a valve seat 46. A second convex contoured surface 50 is disposed on the valve seat 46 of the housing 12 between the smaller second bore 42 and the angled surface 44 thereof. In the subject embodiment, the second convex contoured surface 32 is a convex spiral surface in which the radius thereof is increasing in length. It is recognized that a constant radius could be used without departing from the essence of the invention. A fluid chamber 48 is defined in the poppet valve 10 by the end portion 24 of the poppet 14, a bottom portion of the first bore 40 and the angled surface 44 of the housing 12.

The spring 16 is disposed in the spring chamber 17 of the housing 12 between the bottom of the counterbore 26 of the poppet 14 and the spring retainer member 18. The spring retainer member 18 is secured in the housing 12 fin any of various known ways, such as, welding, press fit, pinned, threaded, etc.

Referring to FIG. 2, an enlarged portion of the valve seat 46 of FIG. 1 is illustrated. As noted above, the first convex contoured surface 32 is a spiral surface having a continuously changing radius. In the subject arrangement, the radius of the surface is continuously increasing in length the axis of the spiral as the contour is being generated. One end of the first spiral surface 32 is tangent with the end surface 30 and the other end thereof is tangent with the angled surface 34. The shortest radius of the first convex spiral surface 32 is at the point of tangency with the end surface 30.

The second convex contoured surface 50 is also a spiral surface having a continuously changing radius. One end of the second convex spiral surface 50 is tangent with the smaller second bore 42 and the other end thereof is tangent with the angled surface 44 of the housing 12. The shortest radius of the second convex spiral surface 50 is at the point of tangency with the smaller second bore 42.

In the illustrated closed position, the poppet 14 contacts the valve seat 46 generally at a point midway between the ends of the first spiral convex surface 32. The midway point along the first convex spiral surface 32 contacts the valve seat 46 general at the point of tangency between the second convex spiral surface. 50 and the angled surface 44 of the housing 12.

Referring to FIG. 3, the poppet 14 is illustrated at a position spaced from the valve seat 46 thus allowing fluid flow therethrough. As illustrated by the phantom lines representing fluid flow, the flow therethrough represents a form of a venturi which effectively reduces occurrences of localized low pressure that is responsible for the formation of vapor bubbles.

It is recognized that various forms of the subject arrangement could be utilized without departing from the essence of the invention. For example, even though the subject embodiment is illustrating a simple in-line check valve, the subject arrangement could be used for many types of valves having a poppet 14 that engages a valve seat 46. Likewise, instead of having a plurality of openings 28 in the poppet 14, another port communicating with the fluid chamber 48 could be added to the housing 12 to allow fluid passage therethrough.

Industrial Applicability

In the operation of the subject embodiment, the spring 16 urges the end portion 24 of the poppet 14 against the valve seat 46 to block fluid flow from the fluid chamber 48 to the smaller second bore 42. Any pressurized fluid in the spring chamber adds an additional force urging the poppet 14 against the valve seat 46 to provide a more positive seal between the fluid chamber 48 and the smaller second bore 42.

When the force generated by the pressure of the fluid in the smaller second bore 42 acting on the end surface 30 of the poppet 14 exceeds the sum of the force of the spring 16 and the force of the pressurized fluid in the spring chamber 17 acting on the other end of the poppet 14, the poppet 14 begins to move away from the valve seat 46. The degree of opening between the poppet 14 and the valve seat 46 depends largely on the differential pressure acting across the valving interface and on the volume of fluid being directed thereacross.

As the poppet 14 moves away from the valve seat 46, a small orifice is created for the fluid to flow across. As is well know, the velocity of the fluid flowing across the small orifice increases rapidly. The smaller the orifice the greater the fluid velocity. As illustrated in FIG. 3, the flow of the fluid in the subject invention does not separate from the walls. This is attributed to the fact that the flow path does not have abrupt changes in direction. As illustrated, the area of the path that the fluid flows through is defined by the first convex spiral surface 32 and the outermost portion 24 of the valve seat 46. In the region of the smallest area, the velocity of the fluid is at its maximum. As the fluid exits the region of the smallest area, the area of the flow path is constantly increased without experiencing any abrupt changes in direction. As noted above, abrupt changes in the direction of high velocity fluid results in lower static pressure at the valving interface. By maintaining the static pressure above the vapor pressure, the noise generated by the flow across the valving interface is eliminated or at least substantially reduced.

In one working example, a poppet valve 10 having a flow range from zero to approximately 300 liters/min (approximately 78 gpm) with a differential cracking pressure setting of approximately 1035 kPa (approximately 150 psi) has been used. The smallest radius on the first convex spiral surface 32 is in the order of approximately 2.80 mm (approximately 0.110 inches) and progressively increases to the point of tangency with the angled surface 34 of the poppet 14. The smallest radius on the second spiral surface 50 is in the order of approximately 1.80 mm (approximately 0.070 inches) and progressively increases to the point of tangency with the angled surface 44 of the housing 12. It is recognized that the above noted sizes could vary from that set forth without departing from the essence of the invention. Likewise, it is noted that for poppet valves of different flow requirements and/or different differential pressure settings, the sizes of the first and second convex surfaces 32,50 may be varied to more effectively eliminate or substantially reduce the noise generated by the flow across the valving interface.

In view of the foregoing, it is readily apparent that the subject valving interface provides a poppet valve 10 that is effective to eliminate or substantially reduce noise generated by fluid flow therethrough.

Other aspects, objects and advantages of the invention can be obtained from a study of the drawings, the disclosure and the appended claims.

I claim:

1. A valving interface for a poppet valve, comprising:

a housing having a first bore, a smaller second bore at one end thereof with an angled surface extending outwardly from the smaller second bore towards the first bore to define a valve seat;

a poppet slidably disposed in the first bore of the housing and having an end portion with an end surface, an angled surface generally adjacent the end surface, and a spiral convex contoured surface disposed between the end surface and the angled surface.

2. The valving interface of claim 1 wherein the radius of the convex spiral surface is smallest at the point of tangency with the end surface of the poppet.

3. The valving interface of claim 2 wherein a fluid chamber is defined in the housing by the angled surface in the housing, the first bore and the end portion of the poppet.

4. The valving interface of claim 3 wherein the poppet has a counterbore in the other end thereof and a plurality of openings are defined in the poppet between the fluid chamber and the counterbore.

5. The valving interface of claim 4 wherein a spring retainer member having an opening therein is secured in the housing on the end thereof opposite the smaller second bore and a spring is disposed therein between the bottom of the counterbore of the poppet and the spring retainer member.

6. The valving interface of claim 3 including a second convex contoured surface disposed on the valve seat between the smaller second bore and the angled surface thereof.

7. The valving interface of claim 6 wherein the convex contoured surface is a spiral surface.

8. The valving interface of claim 7 wherein the radius of the second convex spiral surface is smallest at the point of tangency with the smaller second bore.

9. The valving interface of claim 8 wherein the angled surface of the housing is connected to the second convex spiral surface at the point of tangency therewith.

10. The valving interface of claim 9 wherein the poppet contacts the valve seat at a point generally midway along the first convex spiral surface thereof.

11. The valving interface of claim 10 wherein the generally midway point of the poppet contacts the valving seat at a location generally adjacent the point of tangency between the second convex spiral surface and the angled surface of the housing.

12. The valving interface of claim 11 wherein the poppet has a counterbore in the other end thereof and a plurality of openings are defined in the poppet between the fluid chamber and the counterbore.

13. The valving interface of claim 12 wherein a spring retainer member having an opening therein is secured in the housing on the end thereof opposite the smaller second bore and a spring is disposed therein between the bottom of the counterbore of the poppet and the spring retainer member.

* * * * *